6 SHEETS.
H. J. SMITH.
APPARATUS FOR NAVIGATING AND OPERATING TORPEDO-BOATS.
No. 184,182.     Patented Nov. 7, 1876.
6 Sheets—Sheet 1.
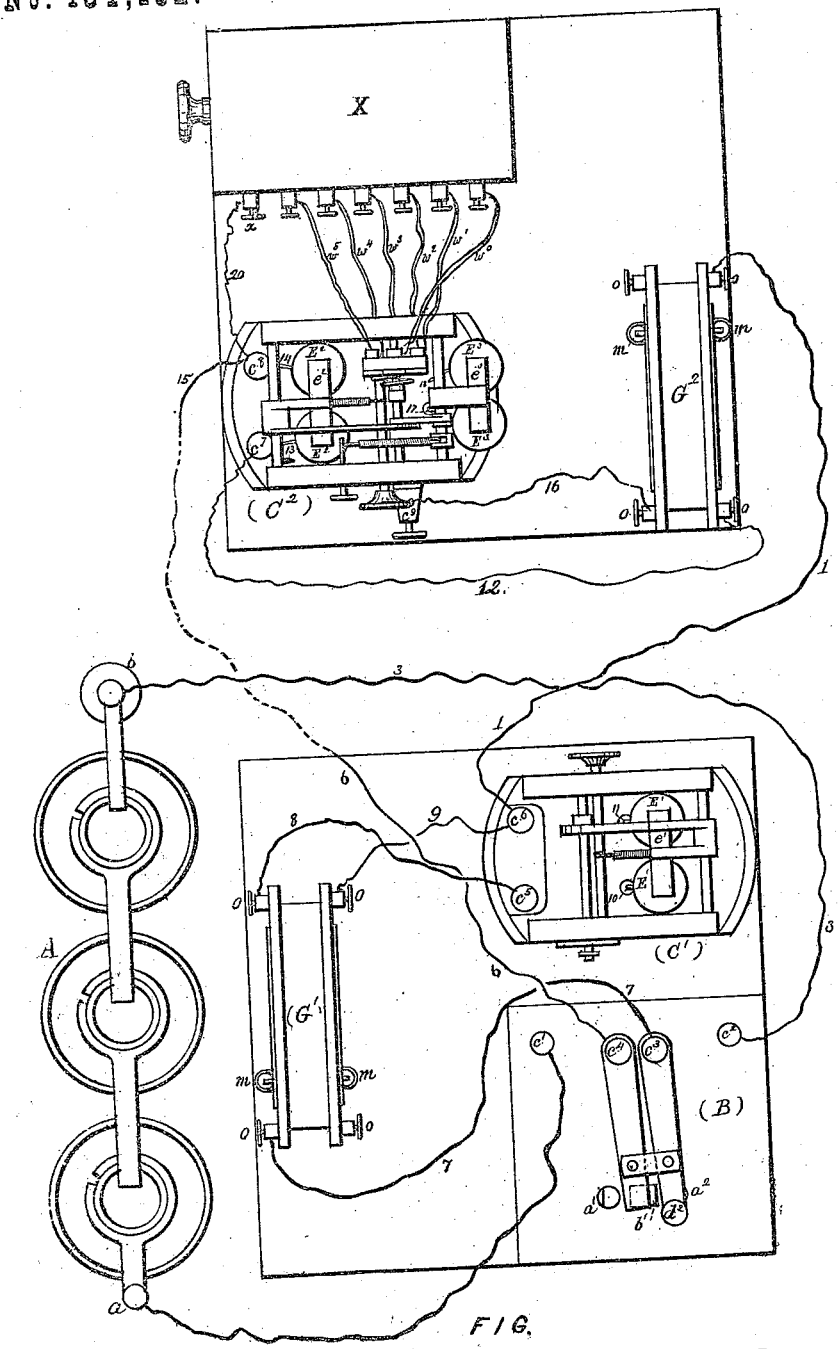
FIG.
WITNESSES.        INVENTOR.

H. J. SMITH.
APPARATUS FOR NAVIGATING AND OPERATING TORPEDO-BOATS
No. 184,182. Patented Nov. 7, 1876.

H. J. SMITH.
APPARATUS FOR NAVIGATING AND OPERATING TORPEDO-BOATS.
No. 184,182. Patented Nov. 7, 1876.

H. J. SMITH.
APPARATUS FOR NAVIGATING AND OPERATING TORPEDO-BOATS.
No. 184,182. Patented Nov. 7, 1876.

WITNESSES.
William W Swan
Chas. H. Swan.

INVENTOR.
H. Julius Smith

H. J. SMITH.
APPARATUS FOR NAVIGATING AND OPERATING TORPEDO-BOATS.
No. 184,182. Patented Nov. 7, 1876.

UNITED STATES PATENT OFFICE.

HENRY JULIUS SMITH, OF BOSTON, MASSACHUSETTS, ASSIGNOR TO WILLIAM B. FOWLE, OF SAME PLACE.

IMPROVEMENT IN APPARATUS FOR NAVIGATING AND OPERATING TORPEDO-BOATS.

Specification forming part of Letters Patent No. 184,189, dated November 7, 1876; application filed March 11, 1873.

*To all whom it may concern:*

Be it known that I, HENRY JULIUS SMITH, of Boston, in the State of Massachusetts, have invented an Improvement in the Application of Electrical Apparatus for the Navigation and Operation of Submarine Torpedo-Boats, of which the following is a specification:

A class of vessels known as "submarine torpedo-boats" has heretofore been navigated from a distance by means of an electrical current caused to pass through an insulated wire, which has been run off a reel on board the boat as the boat moved. The electrical current has been employed to open and shut the valves of a steering-engine. Where, however, it has been desired to employ electricity for additional purposes, it has been found necessary to make use of more than one reel-wire.

I have fitted a torpedo-boat with an apparatus by means of which not only the valves of the steering-engine may be operated to steer the vessel, but the propelling-engine may be started, or stopped, or backed, and the torpedo discharged, at the will of the operator, all by means of the electrical current with the use of one reel-wire.

This apparatus and its application, and the manner in which the boat is governed by it, I proceed to describe.

Figure 3:
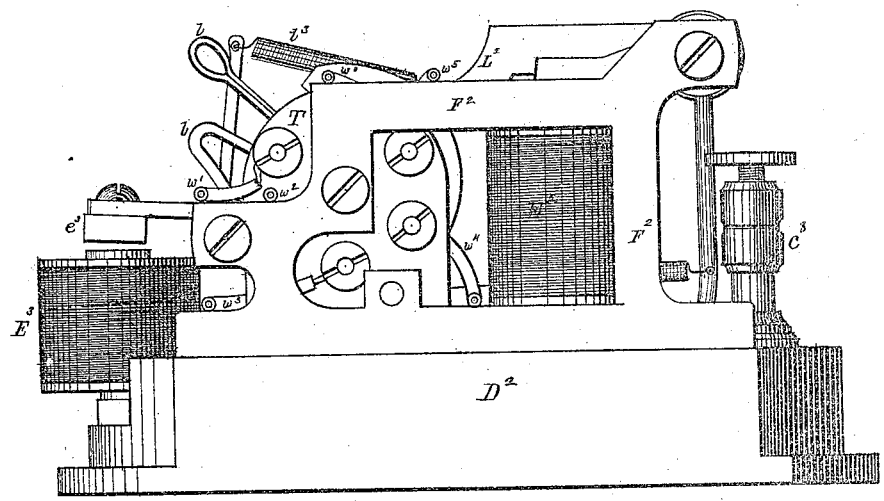
Figure 2:
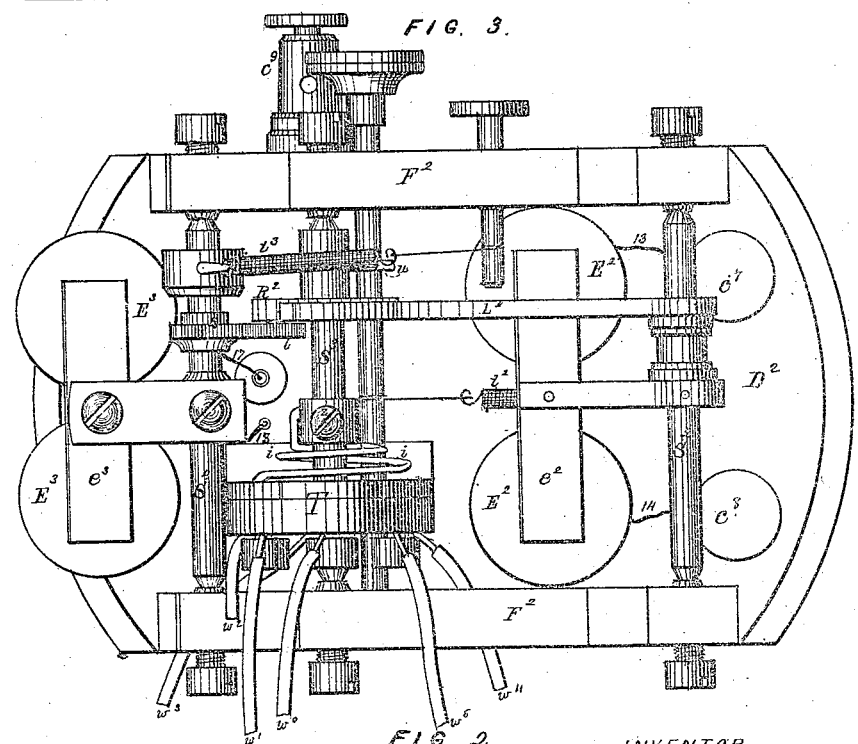
Figure 5:
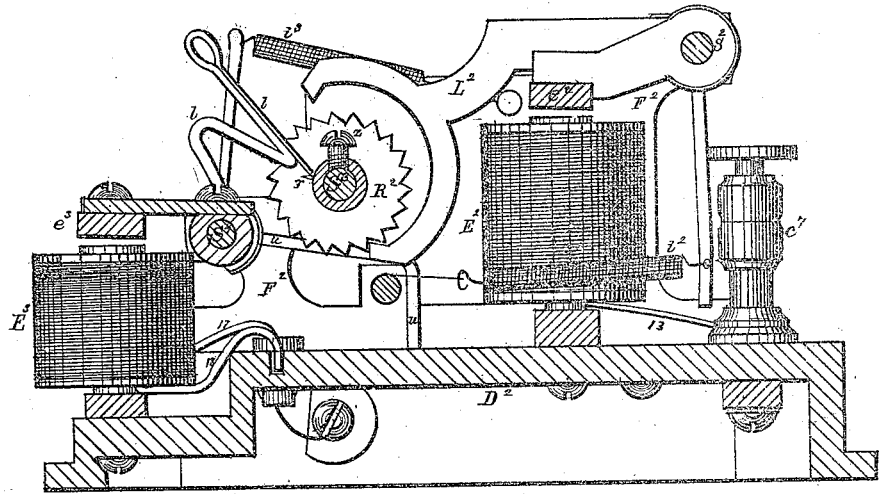
Figure 4:
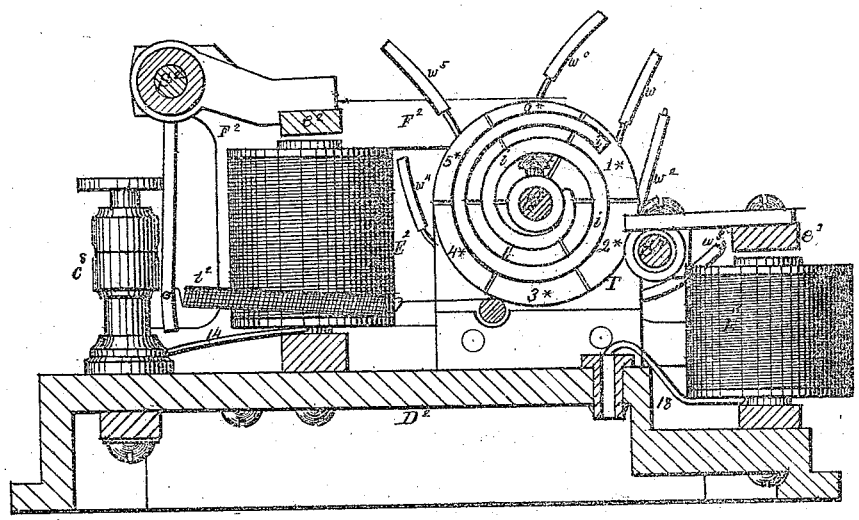
Figure 7:
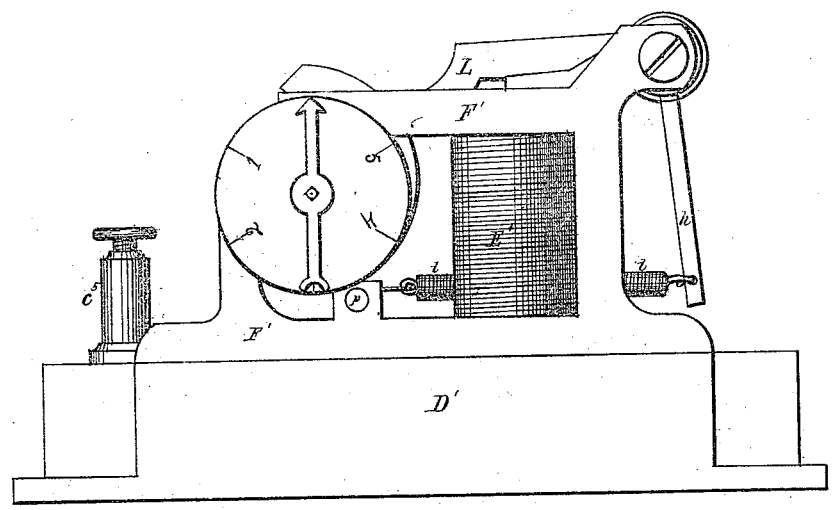
Figure 6:
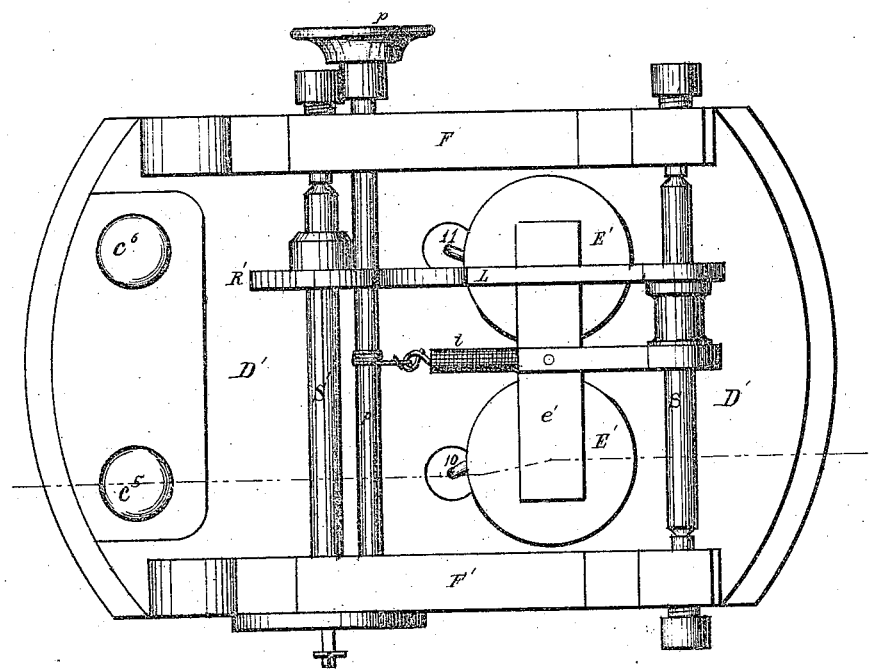
Figure 8:
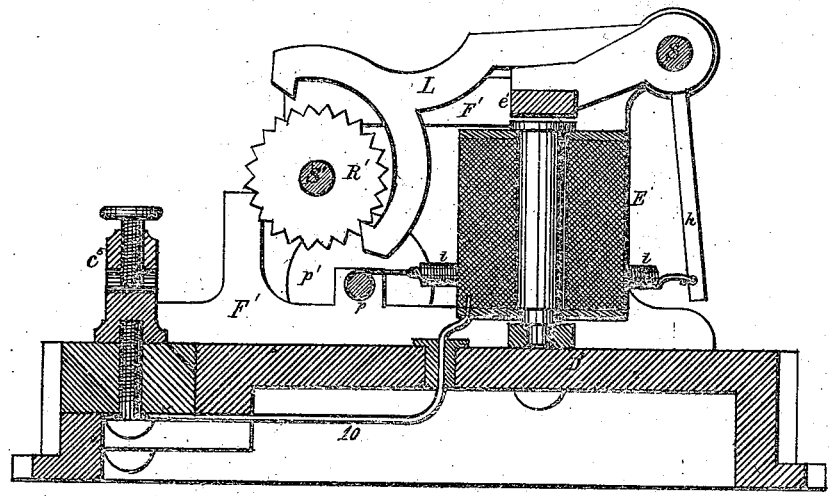
Figure 10:
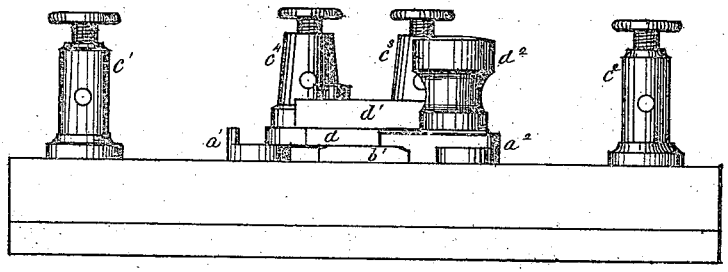
Figure 9:
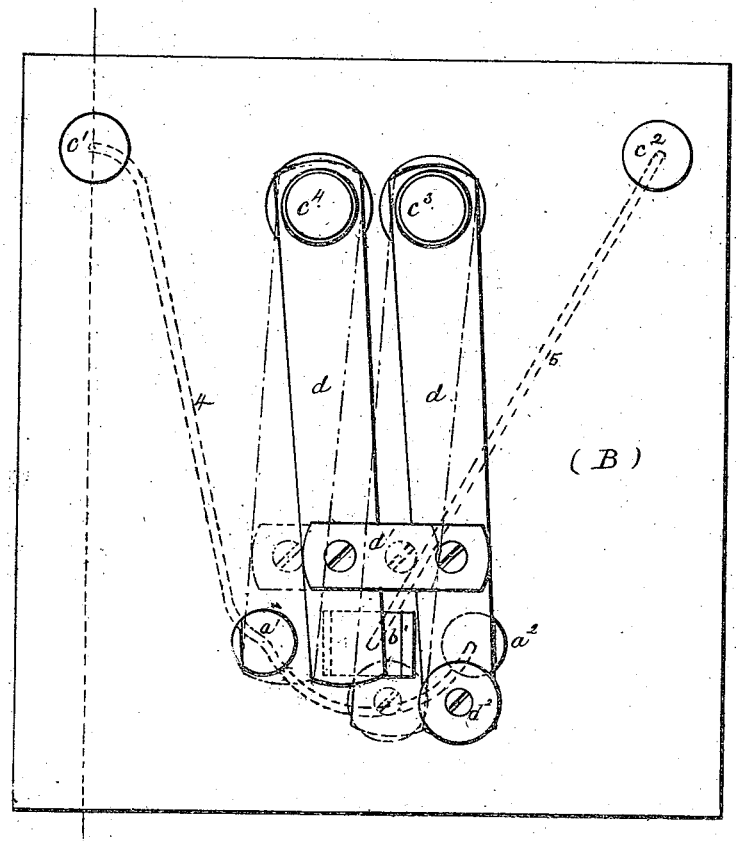
Figure 11:
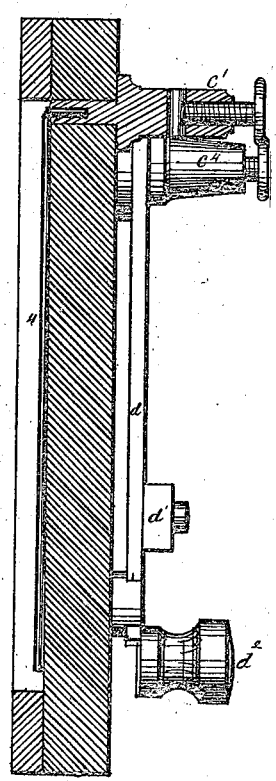

In the drawings, Figure 1 is a plan of the apparatus. Fig. 2 is a plan of the instrument aboard the boat, which, in connection with a galvanometer, also on board the boat, is used to shift or divert the electrical current, so that the current may be used to perform any of the various offices hereinafter mentioned. Fig. 3 is a side elevation of the same instrument. Figs. 4 and 5 are sectional elevations of the same. Fig. 6 is a plan of an, in part similar, instrument at the station of the operator, to tell the condition of the instrument shown in Fig. 2. Fig. 7 is a side elevation of the instrument shown in Fig. 6. Fig. 8 is a sectional elevation of the same. Fig. 9 is a plan of the device used for an operating-key and pole-changer. Figs. 10 and 11 are, respectively, an end and a sectional elevation of the same.

The plan shown in Fig. 1 is a plan of all the pieces of apparatus used without regard to their positions, further than that the parts shown in the upper part of the sheet represent such of the apparatus as is aboard the boat, while parts shown at the bottom of the sheet represent the parts present with the operator, the two classes of apparatus being connected by a single insulated wire, (marked 1 in the drawings,) which is run off from a reel on board the boat as the boat advances.

A is the battery, $a$ being the zinc pole, and $b$ the platinum pole. Wires 2 and 3 connect, respectively, the zinc and platinum poles with the screw-cups $c^1$ and $c^2$ of the operating device. (Shown at B in Fig. 1, and elsewhere.) The screw-cup $c^1$ is connected by a wire, 4, with the knobs $a^1$ and $a^2$, and the screw-cup $c^2$ is connected with the knob $b^1$ by wire 5. A switch, $d$, consists of two parallel arms, united by a non-conductor, $d^1$, and pivoted in the screw-cups $c^3$ $c^4$. One arm has the finger-key $d^2$. The operation of the switch is obvious upon an inspection of Fig. 9. From the screw-cup $c^4$ there is an insulated wire, 6, leading to the earth or water; and from screw-cup $c^3$ an insulated wire, 7, connects with a galvanometer, $G^1$, which is constructed substantially like the galvanometer shown in my application for a patent for a submarine torpedo now pending in the Patent Office, the needle having a yoke which comes in electrical contact with one of two mercury-cups, $m$ $m$, accordingly as the needle is deflected. A wire, 8, connects the galvanometer $G^1$ with the dial-instrument shown in Figs. 6, 7, and 8, and also at $C^1$ in Fig. 1. Another wire, 9, leading from the galvanometer is in reality a direct continuation of the wire 1, attached to the reel on board the boat. This reel is not shown, but wire 1 is to be understood as passing over a reel.

In the dial-instrument, $D^1$ is the bed-plate, and $F^1$ the frame. $E^1$ is an electro-magnet, connected with the galvanometer $G^1$ by wire 10, screw-cup $c^5$, and wire 8, and with the galvanometer on board the boat by wire 11, screw-cup $c^6$, and reel-wire 1, the circuit being completed as hereinafter indicated. The armature of the electro-magnet $E^1$ is marked $e^1$. It is rigidly connected with a rock-shaft, S, having bearings in the frame, as shown. To the rock-shaft S is also attached a lever, L, which, by its oscillations, operates a ratchet-wheel, $R^1$, mounted upon a second spindle, $S^1$, having bearings in the frame. As the spindle $S^1$ revolves it turns a hand or pointer, which is attached to it at one end and swings over the dial, (shown in Fig. 7,) for a purpose hereinafter fully set forth. The rock-shaft S is vibrated by the action of the armature $e^1$, in connection with the spring $t$, which is attached at one end to an arm, $h$, extending down from the rock-shaft S; and at the other end, as shown, to a winder, $p$, operated by its head $p'$ to regulate the tension of the screw. As before stated, $G^2$ is the galvanometer on board the boat.

The screw-cups of both galvanometers are marked $o$, and the mercury-cups $m$, there being the proper connection between the mercury-cups and screw-cups. Besides the reel-wire 1, connecting with the galvanometer $G^2$, as before stated, the galvanometer has two wires, 12 and 16, connecting it with an instrument shown in Figs. 2, 3, 4, and 5, and at $C^2$ in Fig. 1, which will next be described, and whose office is to bring into circuit, as desired, electro mechanism situated in various parts of the boat, as hereinafter set forth. This last-mentioned instrument contains two separate mechanisms, one or the other of which is operated, accordingly as a current of one or the opposite polarity passes through the galvanometer $G^2$. A current of one polarity, entering the instrument by means of wire 12, the circuit being completed as hereinafter set forth, operates electro mechanism substantially the same as that shown in the dial-instrument, and it is, therefore, unnecessary to describe it further than to say that $E^2$ is the corresponding electro-magnet; $e^2$, the armature; $S^2$, a rock-shaft; $L^2$, the lever; $S^3$, the ratchet-wheel spindle; $R^2$, the ratchet-wheel, and $t^2$ a spring, having its tension regulated as in the other instrument. The frame of this instrument is marked $F^2$, and the bed-plate $D^2$. The spindle $S^3$, instead of carrying a hand or pointer, carries a circuit-closer, which is a copper spring, $i$, the position and tension of which are determined by a set-screw, Z. One end of the circuit-closer $i$, as it revolves, presses against some one of the sectors marked 1* 2* 3* 4* 5* 0* of a plate, T, corresponding to the dial-plate before described. Each of these sectors is insulated as regards the others, but is connected with apparatus in another part of the boat by a corresponding wire, $w^1$, $w^2$, &c. One spool of the magnet $E^2$ is connected with the screw-cup $c^2$ by wire 13; the other spool is connected, by wire 14, with screw-cup $c^6$, whence wire 15 leads to the side of the boat or to the water, completing the circuit with the water-wire 6. The ratchet-wheels $R^1$ and $R^2$ have the same number of teeth, viz., 24.

It is obvious that the mechanism just described will work in unison with the dial-instrument. That the operator may be sure, however, that the mechanisms are in unison, a stop is provided for the instrument $C^2$. It consists of a small catch, $r$, on the face of the ratchet-wheel, $R^2$, which, as it revolves, is brought against a latch, $l$. This catch corresponds in position to the zero-sector. When, therefore, the ratchet of the dial-instrument has made a complete revolution, the operator may be sure that the circuit-closer $i$ is in contact with the sector 0*, and working the dial-ratchet by hand will cause the pointer to indicate zero on the dial. The other wire, 16, of the galvanometer $G^2$ leads to screw-cup $c^9$, connection thence being made by wire 17 with one spool of electro-magnet $E^3$, the other spool connecting with the spindle $S^3$ by wire 18 and the frame-work, and the circuit being completed by the circuit-closer $i$, sector-plate T, and wires $w^1$, $w^2$, &c., leading to other separate electro-magnets, each of which has one wire running to the water. The armature of electro-magnet $E^3$ is marked $e^3$. By its vibrations it actuates the latch $l$ through the spindle $S^4$, as shown in Fig. 5. A spring, $t^3$, raises the armature when not attracted by the magnet, and a stop, $u$, limits its upward motion, as shown in Fig. 5.

The additional electro mechanism referred to as situated in other parts of the boat for performing various offices is simple, and requires little explanation. In each case there is an electro-magnet, by the vibration of whose armature a valve is moved in the ordinary way, or a lanyard pulled, clock-work put in operation, &c., one spool of the electro-magnet being connected with the sector-plate T by a wire, $w^1$ $w^2$, and the other having a wire running to the water.

In the drawings, to save space, each of the wires $w^1$, $w^2$, &c., is represented as leading to a separate screw-cup in a case, X. Each screw-cup has its electro-magnet, but each electro-magnet has one wire leading to the screw-cup $x$, whence a common wire, 20, leads to screw-cup $c^8$, and thence connects with the water-wire 15.

A brief description of the operation of this apparatus will be sufficient. The switch at B being in the position indicated in Fig. 1, it may be assumed that the polarity of the current has just been reversed. The two galvanometers have been similarly affected, and the electro-magnets of both ratchet mechanisms are in the circuit. The operator operates the key until the dial indicates the work he wishes to perform, when he shifts the switch, thereby reversing the current, causing the needles of the galvanometers to swing over, throwing the two ratchet mechanisms out of the circuit, and bringing into the circuit the electro-magnet $E^3$, and, through the circuit-closer $i$, the electro-magnet connected with the required work.

As before indicated, the operator, by means of the unison-stop $r$, may bring both ratchet-wheels to the zero-point before working the ratchets to any required point. Whenever any of the electro-magnets supposed to be at X is in the circuit, the electro-magnet $E^3$ is also in the circuit, and its armature will vibrate at the pulsations given by the key. When, therefore, the armature $e^3$ releases the unison-stop $r$, the wire leading from the sector-plate T should lead, not to any mechanism, but directly to the water.

A skillful operator may dispense with the galvanometer and dial-instrument at his station. Knowing the number of teeth in the ratchet on board the boat, at each operation to be performed he can count the pulsations given by his key after releasing the stop $r$, until he reaches the number corresponding to the sector establishing communication with the required work.

I claim—

1. The combination of the galvanometer $G^2$, the ratchet mechanism operated by electro-magnet $E^2$, the switch mechanism operated by electro-magnet $E^3$, with three or more of the electro-magnets represented at X, and the mechanism connected therewith, for controlling the movements of torpedo-boats, all operated by a single reel-wire, substantially as specified.

2. The combination of a key and pole changer, a galvanometer and dial-instrument at the operator's station, with a second galvanometer, a duplicate of the dial mechanism and switch mechanism, substantially such as is operated by electro-magnets $E^2$ and $E^3$ on the torpedo-boat, all constructed and operated with a single line-wire, substantially as specified.

The above specification of my said invention signed and witnessed, at Boston, this 8th day of March, A. D. 1873.

H. JULIUS SMITH.

Witnesses:
CHAS. H. SWAN,
WILLIAM W. SWAN.